(12) United States Patent
Fritz

(10) Patent No.: US 10,856,680 B2
(45) Date of Patent: Dec. 8, 2020

(54) GLASS VESSEL COMPRISING AN ACCOMMODATED METAL ELEMENT AND METHOD OF PRODUCTION THEREOF

(71) Applicant: maglassX GmbH, Freyung (DE)

(72) Inventor: Christoph Fritz, Mauth (DE)

(73) Assignee: MAGLASSX GMBH, Freyung (DE)

( * ) Notice: Subject to any disclaimer, the term of this patent is extended or adjusted under 35 U.S.C. 154(b) by 181 days.

(21) Appl. No.: 15/916,416

(22) Filed: Mar. 9, 2018

(65) Prior Publication Data

US 2018/0255949 A1  Sep. 13, 2018

(51) Int. Cl.
| | |
|---|---|
| *A47G 19/22* | (2006.01) |
| *C03B 11/06* | (2006.01) |
| *C03C 27/04* | (2006.01) |

(52) U.S. Cl.
CPC ..... *A47G 19/2261* (2013.01); *A47G 19/2227* (2013.01); *C03B 11/06* (2013.01); *A47G 2200/10* (2013.01); *C03C 27/04* (2013.01)

(58) Field of Classification Search
CPC ............ A47G 19/2227; A47G 19/2261; A47G 2200/10; C03B 11/06; C03C 27/04
USPC .......... 220/483, 574, 628, 737–740; 206/818
See application file for complete search history.

(56) References Cited

U.S. PATENT DOCUMENTS

| | | | |
|---|---|---|---|
| 2,217,514 A | 10/1940 | Henry | |
| 5,769,680 A * | 6/1998 | Hoffman | A47G 19/2227 206/217 |
| 2004/0001332 A1 * | 1/2004 | Solowiej | A47G 19/2227 362/101 |
| 2006/0008625 A1 * | 1/2006 | Recker | B29C 44/1228 428/195.1 |
| 2008/0128429 A1 | 6/2008 | Towery et al. | |
| 2010/0224642 A1 * | 9/2010 | Beeson | A47G 23/08 220/737 |
| 2011/0114648 A1 | 5/2011 | Proskey | |
| 2013/0105492 A1 * | 5/2013 | Melgoza | A47B 13/08 220/574 |
| 2013/0145797 A1 * | 6/2013 | Lequien | C03B 11/10 65/68 |
| 2013/0213960 A1 | 8/2013 | Cook | |
| 2014/0291335 A1 | 10/2014 | Lee | |
| 2015/0052778 A1 * | 2/2015 | Kirk | A43B 1/0009 36/45 |
| 2015/0251812 A1 * | 9/2015 | Gillie | B65D 25/10 248/683 |
| 2016/0096715 A1 * | 4/2016 | Segiet | B67D 1/0888 222/23 |

FOREIGN PATENT DOCUMENTS

| | | | |
|---|---|---|---|
| DE | 137361 A | 1/1902 | |
| JP | 2014094848 A * | 5/2014 | ............ C03B 11/06 |
| WO | 2005021389 A2 | 3/2005 | |
| WO | 2015149745 A1 | 10/2015 | |

* cited by examiner

*Primary Examiner* — James N Smalley
*Assistant Examiner* — Madison L Poos
(74) *Attorney, Agent, or Firm* — Hoffman Warnick LLC

(57) ABSTRACT

The invention relates to a glass vessel which accommodates a metal element in its base, wherein the glass vessel comprises a lower recess in the base which accommodates the metal element, wherein the metal element is bonded to the base by means of a transparent adhesive at the bottom of the recess and is embedded by a transparent plastic which fills up a remaining area of the recess. The invention further relates to a method for producing a glass vessel.

12 Claims, 6 Drawing Sheets

GLASS VESSEL COMPRISING AN ACCOMMODATED METAL ELEMENT AND METHOD OF PRODUCTION THEREOF

FIELD OF THE INVENTION

The present invention relates to a vessel consisting of glass comprising an accommodated metal element and a method of production thereof. The present invention relates in particular to a drinking glass made of glass and in particular made of crystal glass comprising, in particular a magnetic metal element for use in interaction with a means of transport and in particular for use in a vehicle of any type, and/or for persons with reduced motor skills and/or attention and/or perception and/or as a decorative element.

RELATED ART

The German Utility Model DE 202014002819 U1 discloses a magnetic and metal element for vessels and furnishing elements for non-slip positioning of vessels in a vehicle, whereby it is proposed to arrange a magnetic element at the bottom of a vessel made of any material and any type, wherein the magnetic element can be embedded in the bottom of the vessel.

For providing a high-quality vessel, which can be used in particular as a drinking glass, and which satisfies even the highest in particular optically aesthetic and/or hygienic requirements, a transparent vessel with easy-to-clean surface properties is preferred, which is preferably made of glass.

The WO 2006/128208 A1 discloses a glass body comprising an accommodated gemstone, wherein the glass body should meet the highest optically aesthetic requirements and wherein the essentially entire surface of the gemstone is in contact with the glass body, wherein as a consequence the gemstone is completely introduced into a glass melt during the manufacturing of the glass body.

Due to the different coefficients of thermal expansion of glass and the common metals and/or metals with high magnetic remanence used in jewelry as decorative elements, undesirable stresses occur in the region of the metal element during cooling of the glass melt with a metal element introduced into the glass melt, which can lead to the occurrence of cracks up to the complete fracture of the glass. In particular, when using a magnetic metal element, any magnetic remanence of the magnetic element is destroyed due to the high temperature of the glass melt, so that the metal element is undesirably completely demagnetized.

Namely, if the metal element comprises a magnet, which is desirable in particular for the use of a vessel as a slip-resistant vessel in interaction with a means of transportation and in particular for use in a vehicle, the magnetic remanence of the magnet will not only be demagnetized at a temperature in said temperature range of a glass melt of about 1400 degrees Celsius, but can already be massively affected in a lower temperature range of e.g. 300° C.

In addition, in the method proposed in WO 2006/128208 A1 it cannot be completely excluded that small air inclusions or bubbles occur at the gemstone/glass interface during the production process, which is likewise not desirable for a high-quality optically aesthetic overall impression of a metal element embedded in a glass.

The WO 2012/006428 A1 discloses a vessel comprising a radio-frequency identification tag (RFID tag), wherein in particular the visual appearance of the vessel is greatly changed.

It is therefore an object of the present invention to provide a glass vessel with an embedded metal element, which satisfies the highest in particular also optically aesthetic requirements, which has a satisfactorily long service life, which is insensitive to external influences, such as, for example, weather influences, which can also be cleaned without hesitation, for example in dishwashers, and which is also capable of accommodating a magnetic metal element in the vicinity of its base without affecting its intended magnetization during its production, so that the vessel is particularly preferable for use as a slip-resistant vessel in interaction with a means of transport and also in interaction with suitable furnishing elements, and so that the vessel is particularly preferable for use in a vehicle of any kind, and moreover that the vessel is also preferable for use as a slip-resistant, safe standing and manageable vessel for persons with reduced motor skills and/or attention and/or perception and/or as a decorative element.

SUMMARY OF THE INVENTION

In this connection it is another object of the present invention to provide a method for producing a glass vessel which is preferable for a glass vessel according to the invention and which is particularly preferable for cost-effective industrial mass production.

The objects of the invention are solved with the features of the independent claims. Preferred embodiments of the invention are set forth without limitation in the features of the subclaims and/or the following description which is accompanied by schematic drawings.

More particularly, the present invention relates to a glass vessel which accommodates a metal element in its base, wherein the vessel comprises a lower recess in its base which accommodates the metal element, wherein the metal element is bonded to the bottom of the recess by means of a transparent adhesive and is embedded by a plastic material filling a remaining area of the recess and adhering to the vessel and the metal element.

Due to fact that the metal element is adhesively bonded to the base of the recess by means of a transparent adhesive, on the one hand the metal element is fastened to the base of the vessel and, on the other hand, the bottom of the recess is sealed by means of the adhesive and the metal element. Moreover, the sealing of the bottom of the recess is particularly preferred, since liquid plastic penetrating between the metal element and the bottom of the recess is thereby prevented while filling the recess with plastic material. In addition the formation of air bubbles between the metal element and the bottom of the recess during curing of the plastic is prevented, so that an optically aesthetic appearance of the metal element in the transparent vessel is not impaired by entrapped air bubbles.

Moreover, by embedding the metal element in plastic material, the adhesion of the metal element to the base of the vessel is further enhanced. Moreover, in the case of the metal element being completely embedded in plastic, the metal element is advantageously protected by the plastic against external influences, such as weather influences or during cleaning, for instance also in dishwashers.

For providing a desirable in particular optically aesthetic appearance, a preferable thermal resistance and a desirable resistance to chemical agents, the vessel is preferably formed of a crystal glass.

According to a preferred embodiment of the invention, the vessel, the recess and the metal element are formed substantially axially symmetric to an axis of symmetry, wherein the recess has a depth in the axial direction, which corresponds substantially to the thickness of the metal element in the axial direction, and wherein moreover a magnetic metal element is provided as the metal element. This embodiment is particularly advantageous for the use of the vessel as a slip-resistant drinking vessel in interaction with a suitable means of transport and in particular for use in interaction with suitable furnishing elements as a slip-resistant drinking vessel in a vehicle of any kind and/or as a slip-resistant reliably manageable vessel for persons with limited motor skills and/or attention and/or perception and/or as a decorative element.

A particularly preferred magnet for providing an above embodiment of the invention is preferably formed as a flat disc-shaped cylinder with axial polarity, which in particular can preferably be a neodymium magnet supplied with a copper-nickel protective layer. By the preferred symmetrical geometry described above, a particularly secure stand and a particularly stable and easy handling of the vessel is ensured. In this context, it should be noted that the term "axially symmetric" in the overall context of the present application is defined very broad, and that in addition to axially symmetric geometries with a circular cross section the term also includes any other axially symmetric geometries such as hexagonal or trigonal symmetries of the vessel and/or the recess and/or the metal element.

According to a further preferred embodiment, the recess is formed substantially as a flat truncated cone with a base surface having a first diameter and a top surface having a second diameter, wherein the base surface of the truncated cone is the aperture plane of the recess at the bottom of the base and the top surface of the truncated cone is the bottom of the recess, and wherein the depth of the recess corresponds to the height of the truncated cone.

Moreover, in this embodiment, the height of the truncated cone and the diameter of its base surface and the diameter of its top surface are each selected in such a predetermined manner that a half aperture angle of the truncated cone or the recess ranges between 15 and 30 degrees and preferably between 20 and 23 degrees, whereby during the production of the vessel with the recess, in particular a tool provided with a punch corresponding to the recess can be advantageously removed from a cooled and solidified glass melt. In addition, a preferred aperture angle of the recess described above allows easy positioning of the metal element on the bottom of the recess or the top surface of the truncated cone.

According to a further preferred modification of the above embodiment, the metal element is formed substantially as a flat cylinder having a predetermined height, which corresponds approximately to the depth of the recess and is preferably slightly smaller than the depth of the recess. Moreover, the diameter of the cylindrical metal element corresponds approximately to the diameter of the bottom of the recess and is preferably slightly smaller than the diameter of the bottom of the recess.

According to a further preferred modification of the preceding embodiment, the plastic which fills the recess accommodating the metal element and which encloses the metal element has a thickness, so that the lower level of the plastic corresponds approximately to the bottom of the base.

By means of the above-described preferred form of the recess with a height which slightly extends the height of the metal element, in particular, a preferred as close as possible positioning of a magnetic metal element to the aperture plane of the recess, and thus at the bottom level of the base of the vessel, is made possible, so that the magnetic potential of the magnetic element, which decreases with the square of the distance, is not unnecessarily attenuated with respect to the level of a peripheral edge at the bottom of the vessel on which the disposed vessel rests.

According to another embodiment of the invention the plastic which encloses the metal element and which together with the metal element completely fills up the recess is a polyurethane, with a polyol and isocyanate component, which are selected in particular, such that the plastic is transparent and adheres to both, the vessel and the metal element in the cured state, and that the plastic has extensive self-repairing properties and thus can also be applied as a thin plastic film.

In the context of the present invention, the term "self-repairing" is understood that in the event of damage or scratching, the cover layer of the plastic material can be completely reversibly restored or can completely restore by itself, if the molecular structure or molecular network of the plastic material of the cover layer is not excessively damaged or destroyed. Such plastic materials are hereinafter described as "soft" in the sense that they avoid damage attempts instead of being injured or scratched, as in case of hard materials. The restoring behavior is depending on the glass point of the material. Thus using external temperature sources, the material temperature can be increased by supplying heat to the material, so that a self-repair process of the material is initiated. Furthermore, the material can also be repaired by polishing the surface. According to the invention, the metal element is preferably covered by a plastic layer with a thickness of 0.5 mm to 2 mm and more preferably of 0.8 mm to 1.2 mm, so that it is ensured that the self-repairing properties of the selected plastic become effective.

In accordance with a further embodiment of the invention, the adhesive which adheres the metal element to the bottom of the recess is a transparent polymer-based modified silane (MS polymer-based) which adheres to glass and metal and to which the above-described polyurethane likewise adheres, which is selected as plastic material for embedding the metal element, so that inclusion of air bubbles in the plastic in the vicinity of the adhesive is avoided.

In accordance with a further embodiment of the invention, the adhesive which adheres the metal element to the bottom of the recess is identical to the plastic which fills up the recess and encloses the metal element.

Moreover the glass vessel may accommodate a preferably substantially two-dimensionally formed RFID tag adjacent to the metal element in its central recess, which together with the metal element is embedded by the transparent plastic, wherein the metal element and RFD tag are preferably disposed adjacent to each other, and wherein the above described thickness or height of the metal element corresponds to the entire thickness or height of the metal element and the RFID tag. The RFID tag and the metal element can be glued together and/or a metallic antenna element of a correspondingly formed RFID tag may adhere to the magnetic metal element due to its magnetic properties.

In a first step according to an embodiment of the method according to the invention, preferably a crystal glass is selected for providing the glass of the vessel, and the recess in the vessel during the production of the vessel is provided by introducing a punch into the glass melt and by removing its stamp after cooling the melt. In this embodiment, the punch is formed on a flat piston roof of the piston of a tool as a blunt cone having a base surface diameter, a top surface diameter, a height and a half aperture angle, wherein each of the same approximately correspond to the diameter of the base surface, the diameter of the top surface, the height and the half aperture angle of the truncated cone of the recess, which is between 15 and 30 degrees and preferably between 20 and 23 degrees, as described above, respectively, whereby in particular the tool which is provided with the punch is advantageously removable from the cooled and solidified glass melt.

In a subsequent second step according to the method of the invention, the metal element is adhered to the bottom of the recess by means of a transparent adhesive, wherein in particular an axially symmetric metal element with its axis parallel and approximately congruent to the axis of an axially symmetric vessel is glued to the bottom of the recess by means of the adhesive. Here, the surface of the metal element facing the bottom of the recess is completely covered by a thin adhesive film and, when the vessel and metal element are joined together, moreover the bottom of the recess adjacent to the metal element is also completely covered by the adhesive film.

In case of the provision of an RFID tag arranged adjacent to the metal element, the metal element and the RFID tag are first connected to one another as mentioned above.

In a subsequent third step in accordance with the method of the invention, the recess is filled up with plastic, whereby the metal element is completely covered by the plastic and subsequently the plastic is cured. Here, a polyurethane with a polyol and isocyanate component is preferably selected as the plastic, such that the plastic is capable of flowing at a working temperature of 60° C. to 80° C., and such that the plastic adheres to the vessel and the metal element in the cured state, and such that the cured plastic has far-reaching self-healing properties as described above. In addition, a predetermined amount of the plastic is preferably selected, which largely fills up the recess with the metal element in the cured state, thereby embedding the metal element such that the metal element is covered by a plastic layer which has a thickness of 0.5 mm to 2 mm and preferably of 0.8 to 1.2 mm.

It is clear that the plastic according to the invention is selected such that the plastic is in the cured state largely solvent resistant and temperature resistant and not water-soluble.

The selected plastic, in which the metal element is embedded, is capable of flowing at a working temperature of 60° C. to 80° C. and is cast in this temperature range in the recess and around the metal element, whereby during the casting of the plastic in said temperature range a magnetic remanence of a permanent magnetic metal element advantageously remains extensively preserved.

In the second step according to an embodiment of the invention, a preferably transparent solvent-free MS-polymer-based adhesive which is preferably moisture-hardening and over-varnishable is selected as an adhesive for sealingly adhering the metal element to the bottom of the recess.

According to a modification of the method according to the invention, in the second step the above-mentioned polyurethane plastic is selected as an adhesive for sealingly adhering the metal element to the bottom of the recess, which, in the third step, completely fills up the recess and completely covers the metal element.

According to a further preferred embodiment of the invention a glass vessel according to the invention, which accommodates a metal element and which in particular accommodates a metal element containing a magnetic element according to the invention is used in particular as a drinking vessel in interaction with a means of transport and in particular in a vehicle of any kind and/or for persons with impaired motor skills and/or attention and/or perception and/or as a decorative element.

Means of transport as mentioned above, as well as mentioned within the overall context of the application, have the meaning of in particular means of transport for the transport of drinking vessels in gastronomy and/or social events such as suitably designed serving carts, serving trays, etc., wherein each of which comprise and/or interact with suitable metal elements interacting with a magnet.

When herein above a vehicle or a vehicle of any kind is mentioned, as well as elsewhere in the application, then in this regard within the entire context of the application in each case land vehicles as well as road or rail vehicles of all types and other types of vehicles such as ships, yachts, boats, ropeways, airplanes, etc., each incorporating suitably designed furnishing elements, are included.

When herein above, as well as elsewhere in the application, persons with reduced motor skills and/or attention and/or perception are mentioned, then in particular people such as children or people in need of care are meant, whose safe proper handling of vessels for liquids such as drinking glasses may be doubtful and for whom therefore a slip-resistant vessel is particularly preferable.

When herein above, as well as elsewhere in the application, the use as a decorative element is mentioned, then within the entire context of the application, in particular and by way of example, the use of a vessel comprising a magnetic metal element in cooperation with metallic furnishing elements, such as wall and ceiling elements, cabinets, shelves, lights, etc., is meant. For example one or more vessels can optically particularly aesthetically interact with light sources of lights comprising metallic frames of ceiling lighting, whereby the vessels may interact with metallic frames.

BRIEF DESCRIPTION OF THE DRAWINGS

For a better understanding of the invention, the above-mentioned embodiments are described in detail below together with further preferred embodiments with reference to schematic accompanying drawings.

In this regard shows:

FIG. 2a a schematic enlarged perspective view of the metal element of the vessel of FIGS. 1a to d, and FIG. 2b a sectional view of a section taken along the line V-V of FIG. 2a of the metal element of FIG. 2a;

FIG. 4a a perspective view of the recess in the base of the vessel of FIG. 3b, and FIG. 4b a reduced side view of a tool for manufacturing the recess of FIG. 4a;

DETAILED DESCRIPTION OF THE INVENTION

Figure 1A:
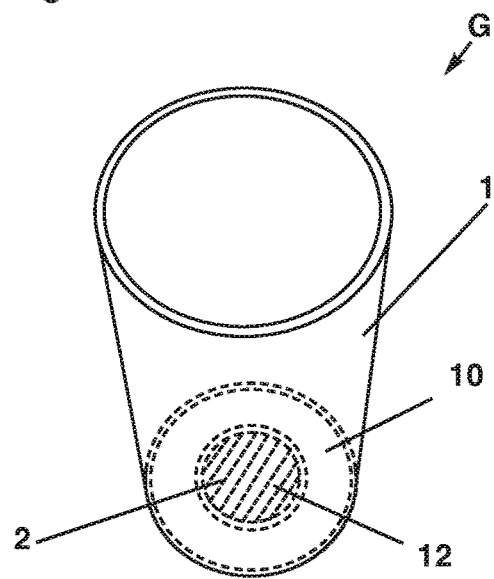
FIG. 1a a schematic perspective view of a vessel according to an embodiment of the invention viewed obliquely from above, FIG. 1b the vessel of FIG. 1a viewed obliquely from below, FIG. 1c a plan view of the vessel of FIGS. 1a and b, and FIG. 1d a sectional view of a section taken along the line V-V of FIG. 1c of the vessel of FIGS. 1a, b and c.
Figure 1B:
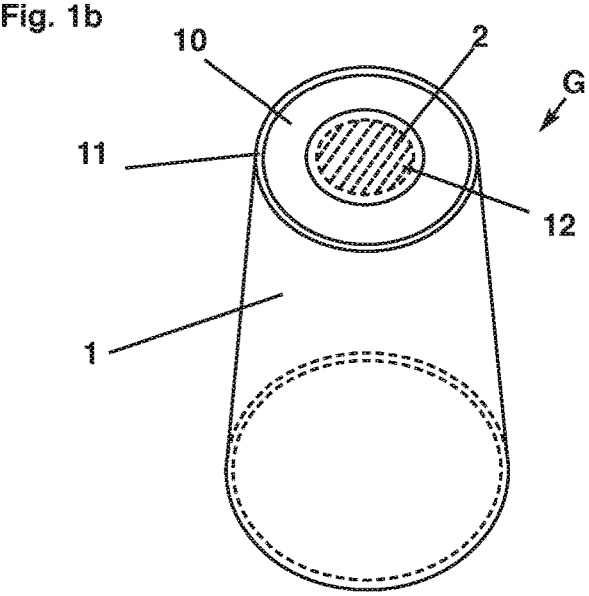
Figure 1C:
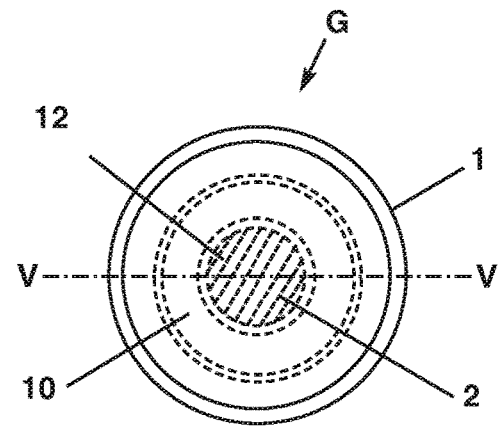
Figure 1D:
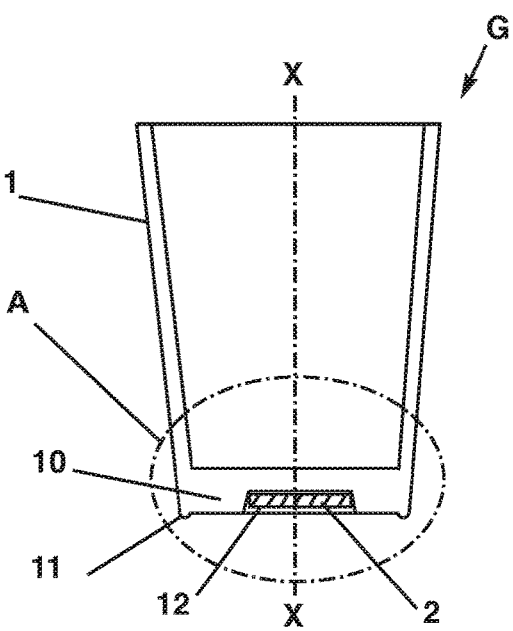

FIG. 1a shows a schematic perspective view of an exemplary cup-like vessel G according to an embodiment of the invention viewed obliquely from above with the glass vessel 1, at the base 10 of which a recess 12 is formed, whereby a space for accommodating a metal element 2 is provided; and FIG. 1b shows a corresponding perspective illustration of the vessel G of FIG. 1a viewed from obliquely below. FIG. 1c shows a schematic plan view of the vessel G of FIGS. 1a and b, and FIG. 1d shows a section through the vessel G of FIGS. 1a, b and c taken along the line V-V of FIG. 1c. The exemplary cup-like vessel according to the invention made of glass G is preferably formed to be axially symmetrical to the longitudinal axis X and comprises a lower outer edge 11 on which the disposed vessel G rests which is formed at the edge of the base 10, and which protrudes downwardly thereby extending the bottom of the base 10. By way of example the glass vessel 1 according to the invention of FIG. 1 is in the form of a cone tapering towards the base 10 of the vessel G, which is preferred in particular for a vessel G which can be stacked well into one another and which in particular can be a drinking vessel.

Figure 2A:
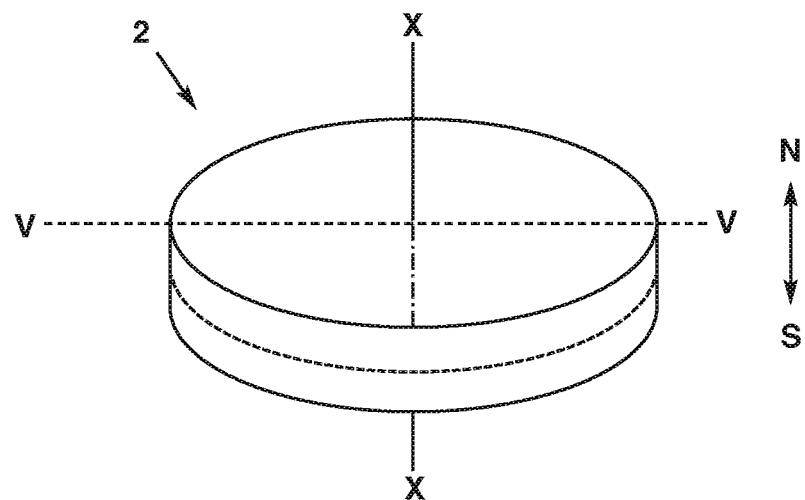
Figure 2B:
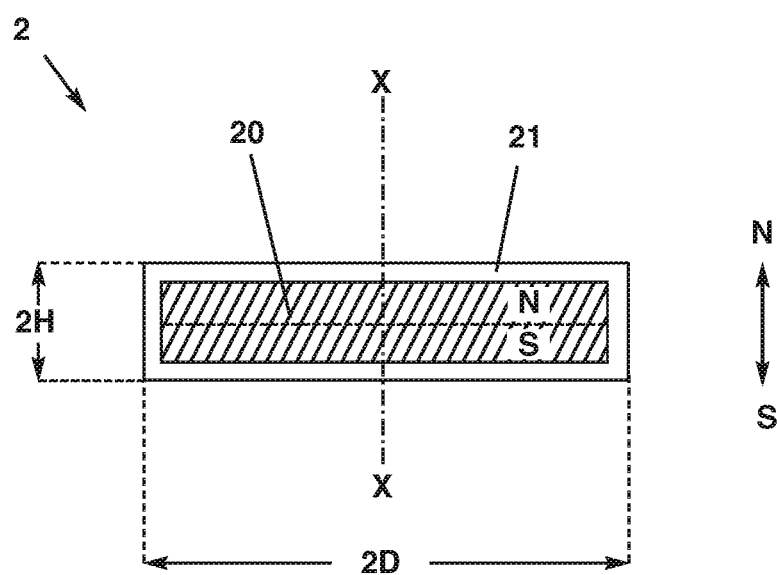

FIG. 2a shows a schematic enlarged perspective view of the metal element 2 of the vessel G of FIGS. 1a to d, which is preferably flat cylindrical disk-shaped and which is formed axially symmetrical to an axis X like the vessel G. According to a preferred embodiment of the invention, the metal element 2 is a magnetic element 20, which may be preferably covered by a protective layer 21. In this regard FIG. 2b shows a section through the metal element 2 of FIG. 2a taken along the line V-V of FIG. 2a, wherein the magnetic element 20 is preferably magnetically poled axially relative to the axis X, thereby creating a particularly strong magnetic field in the axial direction so that the glass vessel 1 with the magnetic element 20 is particularly preferable for its use as a slip-resistant vessel G in combination with a suitable means of transport, and in particular for its use in a vehicle and/or for persons with limited motor skills and/or perception and/or as a decorative element. Each glass of a series of such above described cup-like glasses 1, which are each provided with an axially poled magnetic element 20, is therefore preferably equipped with a polarity in the same direction in the axial direction X of the glasses, so that it is ensured that the glasses 1 are safe and stable stackable into each another.

Moreover the provision of the axially poled magnetic element 20 according to the invention makes it possible to permanently suspend/store such an empty vessel G upside down, with its base 10 upwards and with its opening downwards, for example in gastronomy, so that the interior of the vessel G is considerably protected from dust and dirt.

FIGS. 2a and b show a cylindrical, axially symmetrical metal element 2 according to the invention, which in particular may advantageously comprise a magnetic element 20 having a predetermined height 2H and a predetermined diameter 2D, which will be described in more detail below with reference to FIG. 5.

Figure 3A:
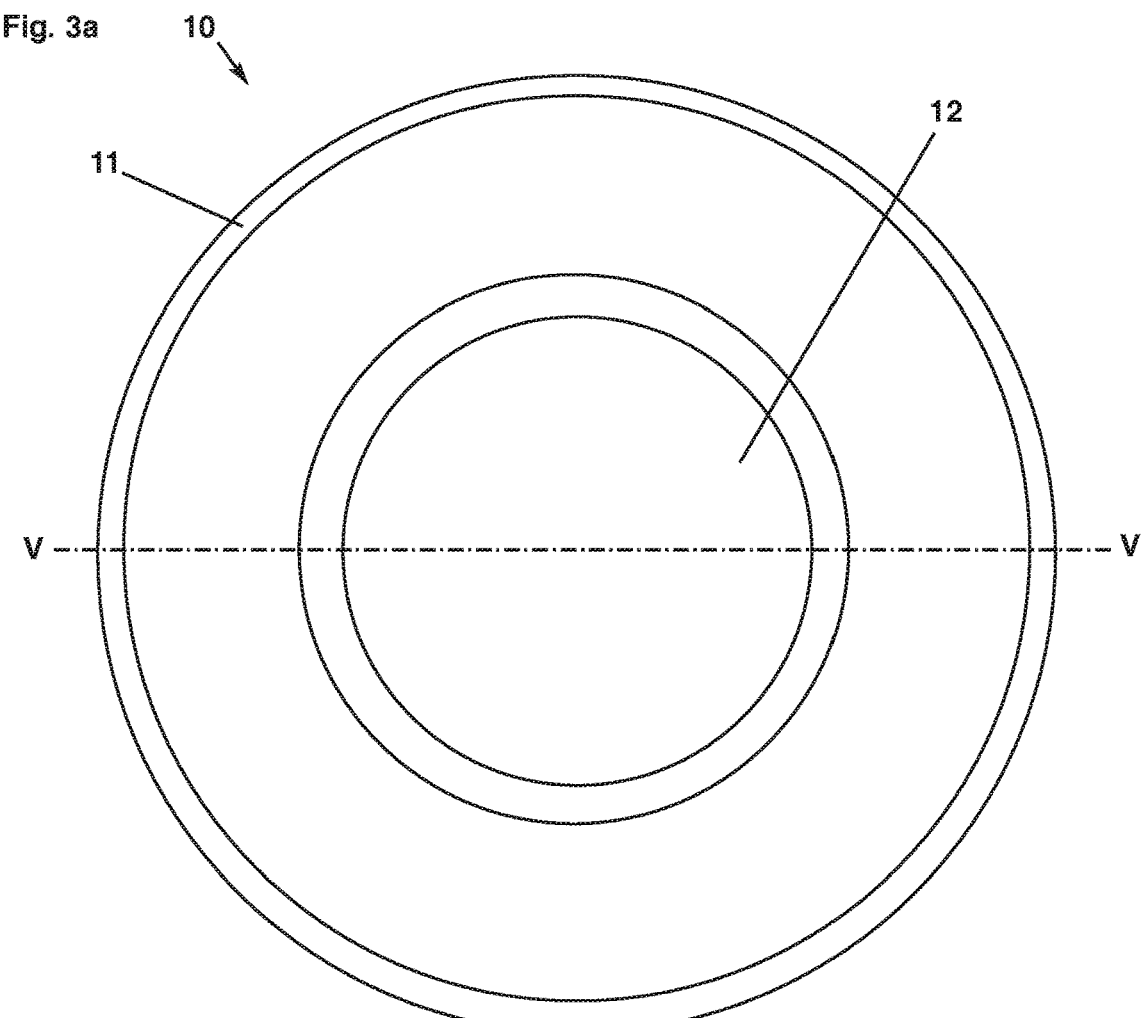
FIG. 3a an enlarged view of the vessel of FIG. 1 from below.
Figure 3B:
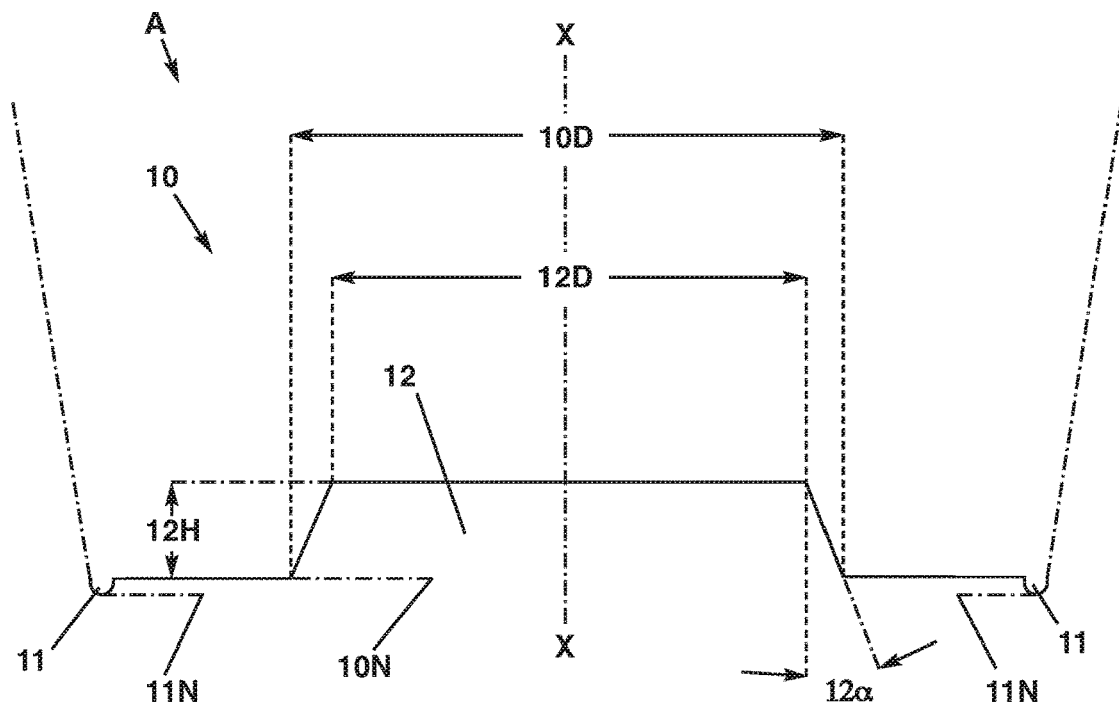
FIG. 3b a sectional view of the vessel of FIG. 3a taken along the line V-V of FIG. 3a and an enlarged view of the detail A of FIG. 1d, respectively.

FIG. 3a shows an enlarged view of the base 10 of the vessel G of FIG. 1 from below with the recess 12 and the peripheral outer edge 11, and FIG. 3b shows a section through the glass vessel 1 of FIG. 3a taken along the line V-V of FIG. 3a and an enlarged view of the detail A of FIG. 1d, respectively. The recess 12 of FIG. 3b is substantially formed as a flat truncated cone with a base surface having a first diameter 10D and a top surface with a second diameter 12D, wherein the base surface of the truncated cone with the diameter 10D is the aperture plane of the recess 12 at the bottom 10N of the base 10, and the top surface of the truncated cone with diameter 12D is the bottom of the recess 12, and wherein the depth 12H of the recess 12 corresponds to the height 12H of the truncated cone, and wherein the height 12H of the truncated cone and the diameter 10D of its base surface and the diameter 12D of its top surface are each selected in such a predetermined manner that a half aperture angle 12a of the truncated cone or the recess 12 has between 15 and 30 degrees and preferably between 20 and 23 degrees, respectively.

Figure 4A:
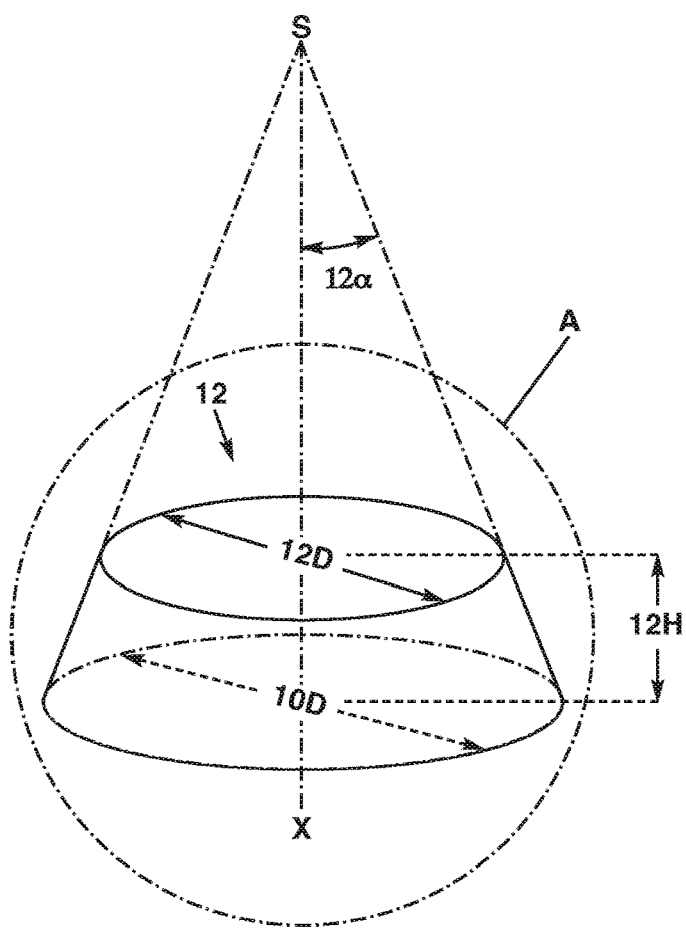

For a better understanding of the preferred geometry of the embodiment of the recess 12 of FIG. 3b, FIG. 4a shows the truncated cone-shaped recess 12 in a perspective view together with the cone having the apex S defining the same, the preferred half aperture angle 12a and the base surface with the diameter 10D and the top surface with the diameter 12D and height 12H. A particularly preferred half aperture angle 12a measures preferably between 20 and 23 degrees.

Figure 4B:
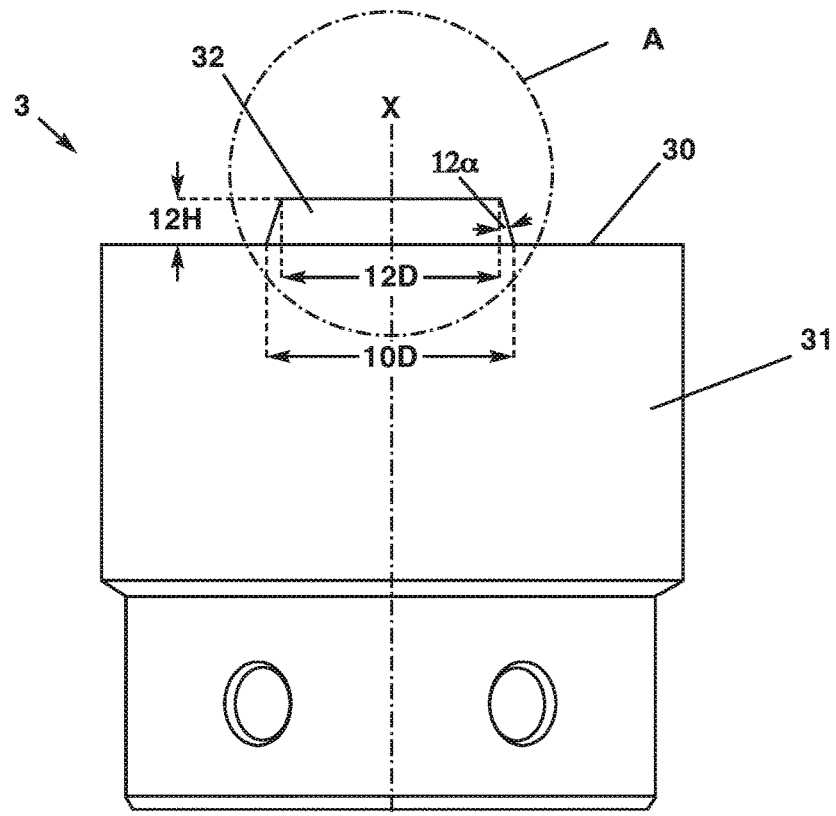

FIG. 4b shows a schematic side view of a preferred tool 3 for providing a truncated cone-like recess 12 according to the invention as described above, with a punch 32 formed on a flat piston roof 30 of a piston 31 corresponding to the recess 12 of FIGS. 3b and 4a, the dimensions of its base surface with the diameter 10D, its top surface with the diameter 12D, its height 12H and its half aperture angle 12a each corresponding approximately to the above-described corresponding dimensions of the recess 12. The punch 32 which corresponds with the recess 12 in section A of FIG. 4a is shown correspondingly reduced in section A of FIG. 4b.

An above described preferred half aperture angle 12a of preferably between 20 and 23 degrees is particularly advantageous for easy removal of the punch 32 from the cooled and solidified glass melt of the vessel 1 during the formation of the recess 12. In addition, such a half aperture angle according to the invention of about 21.5 degrees allows a simple positioning of a metal element 2 together with an RFID tag 6 on the bottom of the recess 12 and the top surface of the truncated cone with the diameter 12D, respectively.

Figure 5A:
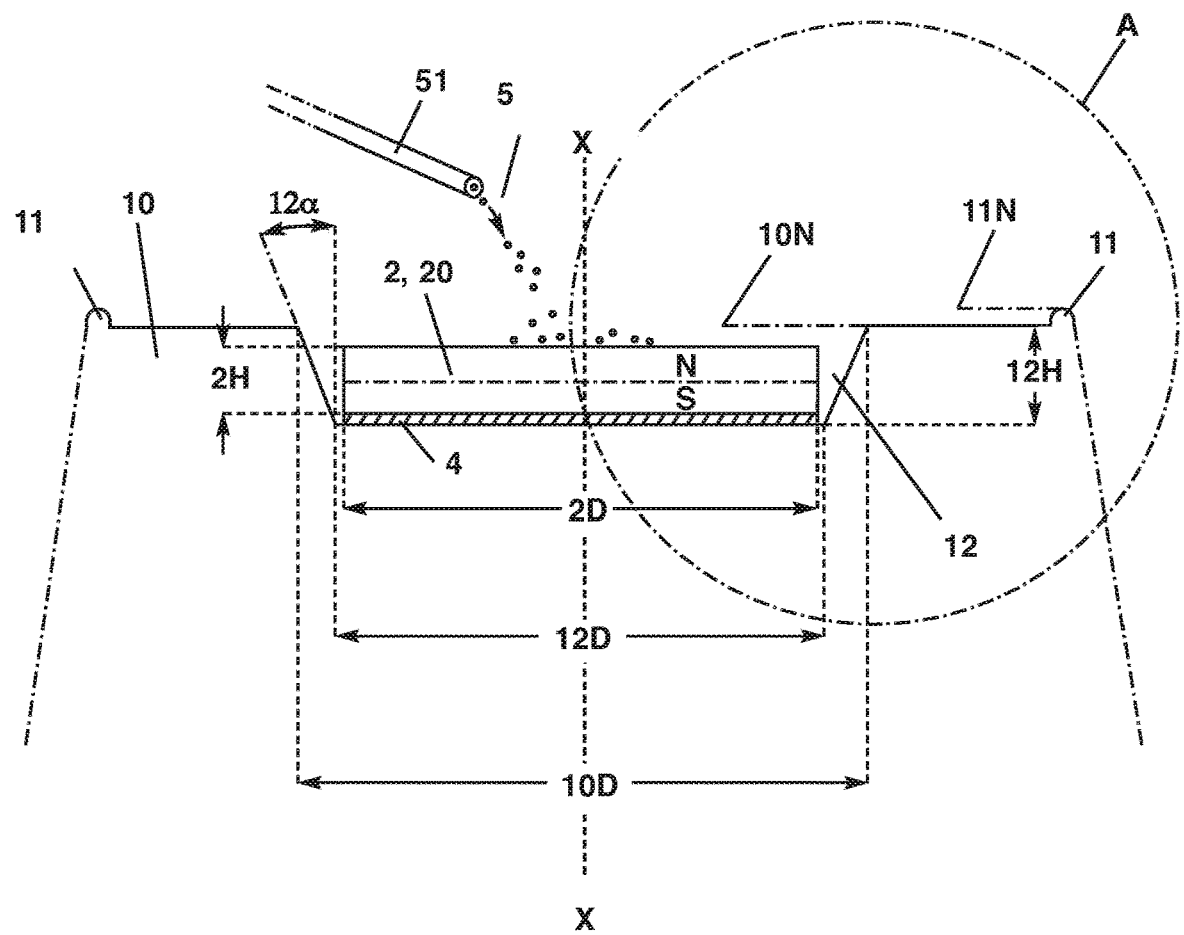
FIG. 5a the base with the recess of the vessel of FIG. 3b with a metal element disposed in the recess during the filling with plastic, and FIG. 5b an enlarged view of the section A of the base of FIG. 5a with a metal element embedded in plastic.
Figure 5B:
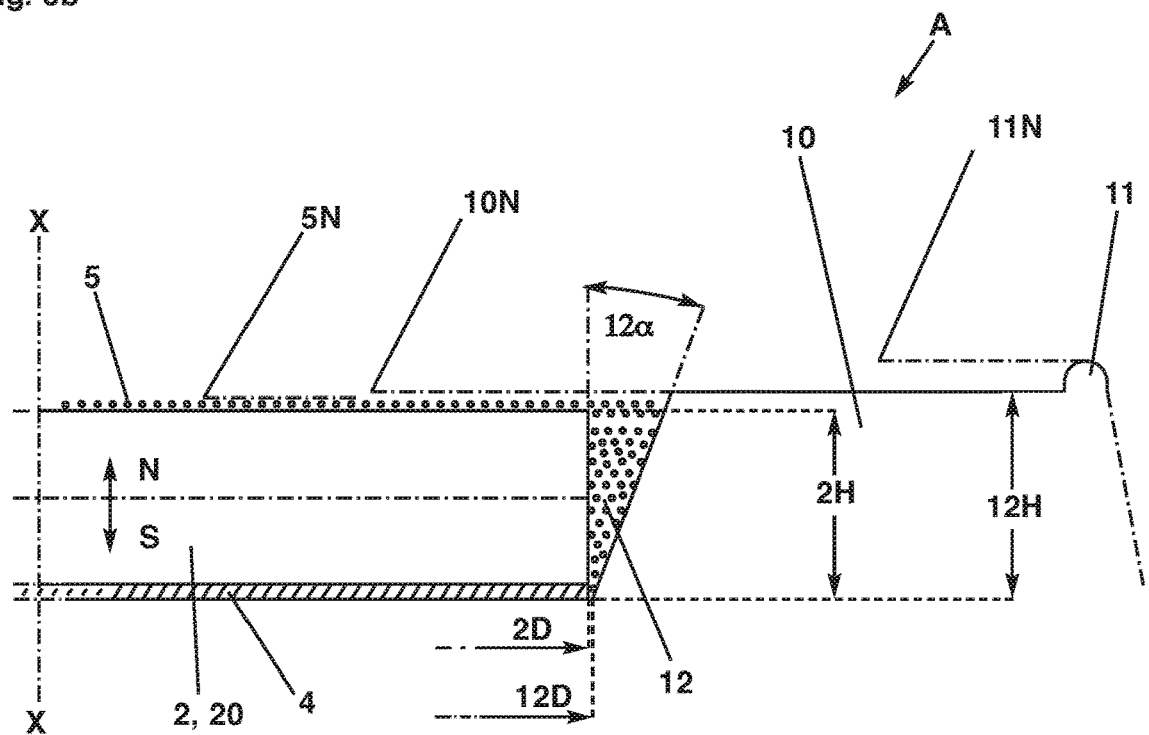

FIG. 5a shows the base 10 of a vessel G according to the invention with the recess 12 of FIG. 3b in the paper plane rotated by 180 degrees with the metal element 2 positioned in the recess 12 during the third step S3 of the method according to the invention in which the recess 12 is filled with plastic 5 by means of casting via a nozzle 51. In the process according to the invention, the metal element 2 is covered by the plastic 5, as schematically shown in FIG. 5b which represents the enlarged detail A of FIG. 5a. As stated above, the base 10 of FIG. 5a corresponds to the correspondingly rotated representation of FIG. 3b, which is the reason why in this connection with respect to the description of the base 10 and the recess 12 reference is made to the description of FIG. 3b and FIG. 4a. Furthermore in the embodiment of FIGS. 5a and b, the metal element 2 which is positioned in the recess 12 is by way of example and preferably a magnetic element with axial polarity in the axial direction X of the vessel G.

The height 2H of the metal element 2 is formed slightly smaller than the height 12H of the recess 12, so that the metal element 2 is advantageously completely retractable into the recess 12, and the diameter 2D of the preferably cylindrically shaped metal element 2 advantageously corresponds substantially to the diameter 12D of the bottom of the recess 12. The metal element 2 is adhered by means of a transparent adhesive 4 on the bottom of the recess 12, whereby on the one hand the metal element 2 is bonded to the bottom and whereby on the other hand the entire bottom of the recess 12 is sealed completely by means of the adhesive 4 and the metal element 2. The complete sealing of the bottom of the recess 12 is particularly preferred, since liquid plastic 5 penetrating between the metal element 2 and the bottom of the recess 12 is thereby prevented while filling the recess 12 with plastic 5. In this manner it is prevented that air bubbles could arise on the bottom of the recess 12 during curing of the plastic 5 and that an optically aesthetic appearance of the metal element 2 in the transparent glass vessel 1 is affected by air bubbles which are enclosed between the metal element 2 and the bottom of the recess 12. The adhesive 4 may preferably be a transparent MS polymer-based adhesive as described above or may be identical to the plastic 5 enclosing the metal element 2.

By means of the preferred design of the recess 12 with a height 12H which is slightly greater than the height H2 of the metal element 2, in particular a preferred positioning of a magnetic metal element 20 as close as possible to the aperture plane of the recess 12 and thus at the bottom level 10N of the base 10 of glass vessel 1 is made possible, so that the magnetic potential of the magnetic element 20, which decreases by the square with the distance is not unnecessarily attenuated with regard to the level 11 N of the edge 11, on which the erected glass vessel 1 rests.

According to the invention, the metal element 2 embedded in the plastic 5 is preferably covered with a plastic layer which preferably has a thickness of approximately 0.8 mm to 1.2 mm, so that a lower level N5 of the plastic 5 approximately matches the level N10 of the lower surface of the base 10 and in no case protrudes above the level 11N of the edge 11, so that a secure and stable stand of the glass vessel 1 is not impaired. The formation of the plastic layer 5 with the above-described thickness of about 1 mm on the metal element 2 also ensures a permanent embedding of the metal element 2 also taking advantage of the preferred self-repairing properties of the polyurethane described above which is used according to the invention.

Figure 6A:
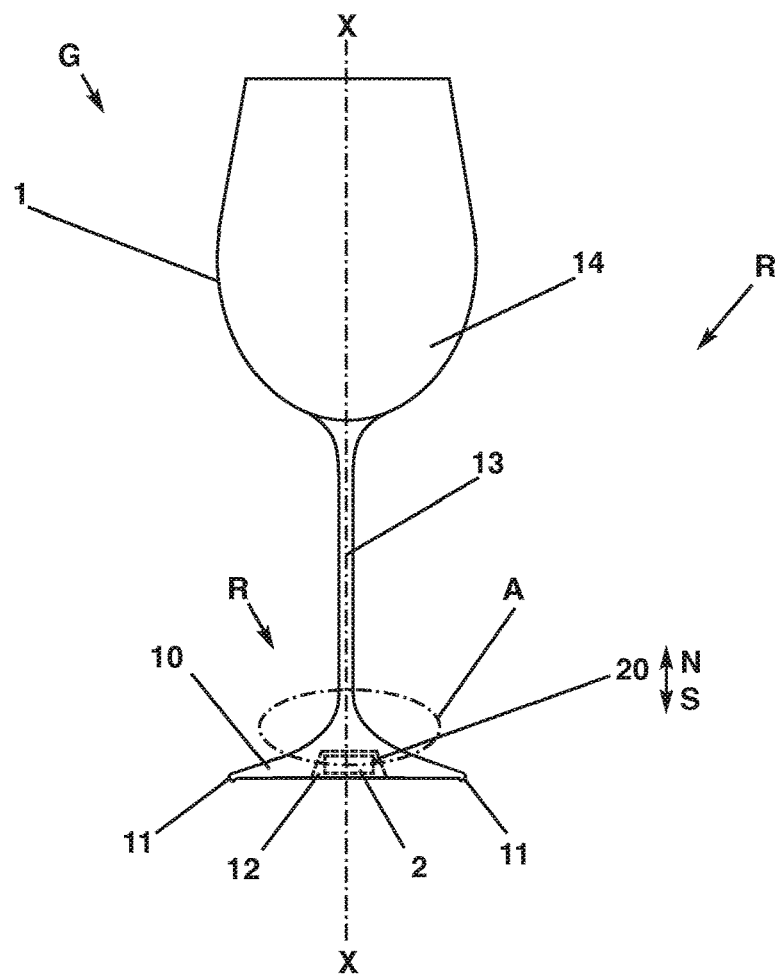
FIG. 6a a schematic representation of a vessel according to a further embodiment of the invention, and FIG. 6b the vessel of FIG. 1d in addition with an RFID tag.

FIG. 6a shows a schematic side view of a vessel G according to a further embodiment of the invention. The vessel G of FIG. 6a is a glass vessel 1 with a cup 14 resting on a style 13 with a base 10. Moreover the base 10, like the base 10 of the embodiment of FIG. 1, has an outer edge 11 on which the disposed glass vessel 1 rests, and a metal element 2 is embedded in a recess 12 of the base 10. The metal element 2 of the embodiment of FIG. 6a, like the metal element 2 of the embodiment of FIG. 5, is likewise adhered to the bottom of the recess 12 by means of a transparent adhesive 4, which in particular advantageously ensures that no undesirable air bubbles can occur between the metal element 2 and the style 13 of the glass vessel 1 thereby disturbing the optically aesthetic impression of the embedded metal element 2. This is particularly desirable regarding the embodiment of FIG. 6a, since, due to the transition of the base 10 into the style 13, in particular in the region of section A of FIG. 6a, a magnifying effect of the vessel section A occurs, resulting in a magnification of the embedded metal element 2, when viewed from for instance direction R.

In the embodiment of FIG. 6a, a magnetic metal element 20 is again preferably poled axially to the axis of symmetry X of the glass vessel 1. In addition, a series of similar glasses 1 is also preferably provided with identically poled magnetic elements 20, so that it is ensured that two or more glasses 1 which are correspondingly fragile due to their rather thin style 13 do not undesirably attract each other by unintentional mutual attraction of their bases 10, whereby an eventual damage is prevented.

Figure 6B:
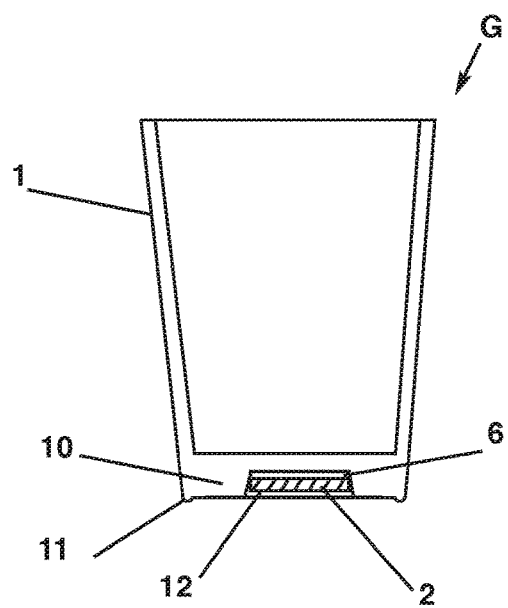
FIG. 6c a schematic flow diagram of the essential steps of an embodiment of a method for producing a vessel according to the invention.
Figure 6C:
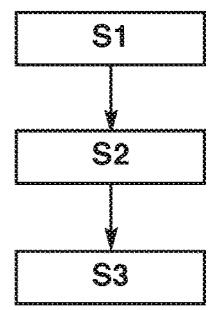

FIG. 6b shows a modification of the vessel 1 of FIG. 1d, in which the vessel 1 accommodates an RFID tag 6 together with the metal element 2, the RFID tag 5 being arranged, for example, adjacent above the metal element 2. The height or thickness 2H of the metal element 2 described above corresponds to the overall thickness of the metal element 2 and the RFID tag 6 in the embodiment of FIG. 6C. Moreover in this embodiment, the RFID tag 6 and the metal element 2 are adhered to the bottom of the recess 12, wherein a metallic antenna element of a corresponding RFID tag 6 can magnetically adhere to a magnetic metal element 2 and/or the RFID tag 6 can be adhesively glued to the metal element 2.

In this manner, as described above with reference to FIG. 5, the bottom of the recess 12 is also completely sealed by the adhesive 4 and thus protected against air inclusions with undesirable bubble formation.

FIG. 7 shows a schematic flow diagram of the essential steps of an embodiment of a preferred method for producing a vessel G of glass according to the invention, wherein, in a first step S1, the recess 12 is provided by inserting a punch 32 in a glass melt of the vessel 1 and by removing the punch 32 after cooling the melt. In a second step S2, the metal element 2 is adhered to the bottom of the recess 12 by means of adhesive 4, wherein an RFID tag 6 may be provided adjacent to the metal element 2 as described above with reference to FIG. 6b. In a third step S3, the recess 12 is filled up with plastic material 5 by means of casting whereby the metal element 2 and the RFID tag 6 are completely covered by the plastic 5, and the plastic 5 is subsequently cured.

The present invention has been described above with reference to FIGS. 1 to 6 by way of example by means of the preferred embodiments of the axially symmetrical vessel G with a cup-shaped vessel 1 of the embodiment of FIG. 1 which tapers conically toward its base 10 and of the embodiment of FIG. 6a described above. It is clear, however, that a glass vessel 1 accommodating a metal element 2 according to the invention can also be embodied in a variety of other imaginable geometries and shapes, with for example rectangular or hexagonal or even oval cross-section and, for example, a hexagonal or trigonal axial symmetry of the vessel G and/or the recess 12 and/or the metal element 2, etc.

REFERENCE SIGNS 1 glass vessel
10 base
10N first level (base level)
11 outer edge
11N second level (edge level)
12 recess (truncated cone)
12H depth of recess (height truncated cone)
12D diameter of top surface of the truncated cone (bottom of recess)

10D diameter of base surface of the truncated cone (opening recess)
12 α half aperture angle of the truncated cone (recess)
13 style
14 cup
2 metal element
20 magnet element
21 layer
2H height metal element
2D diameter metal element
3 tool
30 piston roof
31 piston
32 punch
4 adhesive
5 plastic, plastic material
51 nozzle
5N fill level
6 RFID tag

The invention claimed is:

1. Vessel which accommodates a metal element in its base, characterized in that:
the metal element is a magnetic metal element,
the vessel is a glass vessel, and
the vessel comprises a lower recess in the base which accommodates the metal element,
wherein the metal element is bonded to the base by means of a first transparent adhesive at the bottom of the recess, whereby a surface of the metal element facing the bottom of the recess is completely covered by the first transparent adhesive and the bottom of the recess is completely covered by the first transparent adhesive such that in a first position the metal element is fastened to the base of the vessel and in a second position the entire bottom of the recess is sealed by the first transparent adhesive and the metal element,
wherein the metal element is further completely embedded by a second transparent plastic which fills up a remaining area of the recess and which adheres to both the vessel and the metal element, wherein besides the surface of the metal element facing the bottom of the recess that is completely covered by the first transparent adhesive, the plastic encloses the metal element and the metal element is covered by a layer of the plastic,
wherein the vessel, the recess and the metal element are formed substantially axially symmetrical to an axis,
wherein the recess is formed substantially as a flat truncated cone with a base surface with a first diameter and a top surface with a second diameter and a height,
wherein the base surface of the truncated cone is the aperture plane of the recess on the lower surface of the base and the top surface of the truncated cone is the bottom of the recess,
wherein the depth of the recess corresponds to the height of the truncated cone, and
wherein the height of the truncated cone and the diameter of its base surface and the diameter of its top surface are each selected in such a predetermined manner that a half aperture angle of the truncated cone and of the recess, respectively is between 15 and 30 degrees.

2. Vessel according to claim 1,
wherein the height of the truncated cone and the diameter of its base surface and the diameter of its top surface are each selected in such a predetermined manner that a half aperture angle of the truncated cone and of the recess, respectively is between 20 and 23 degrees.

3. Vessel according to claim 2, wherein the metal element is substantially formed as a flat cylinder with a height and a diameter,
wherein the height of the metal element approximately corresponds to the depth of the recess and is preferably slightly smaller than the depth of the recess, wherein the diameter of the metal element approximately corresponds to the diameter of the bottom of the recess (12) and is slightly smaller than the diameter of the bottom of the recess,
wherein the plastic which fills up the recess together with the metal element and which encloses the metal element has a thickness such that its lower level approximately corresponds to the lower surface of the base, whereby the metal element is covered by a plastic layer having a thickness of 0.5 mm to 2 mm.

4. Vessel according to claim 1, wherein the glass vessel is made of crystal glass, and the metal element is a neodymium magnet with a copper-nickel coating.

5. Vessel according to claim 1, wherein the plastic which fills the recess together with the metal element and encloses the metal element is a polyurethane with a polyol and isocyanate component which are selected such that the plastic in the cured state adheres to the glass vessel and the metal element, and that the plastic is transparent and has extensive self-healing properties,
wherein the adhesive which adheres the metal element to the bottom of the recess is a transparent solvent-free adhesive based on MS polymer or is identical to the plastic.

6. Vessel according to claim 1, wherein an RFID tag is accommodated in the central recess adjacent to the metal element, which is embedded together with the metal element by the transparent plastic.

7. Method of producing the vessel according to claim 1, with the steps:
in a first step, the recess is provided by inserting a punch in glass melt of the vessel and by removing the punch after cooling the melt;
in a second step the metal element is bonded to the bottom of the recess by means of adhesive; and
in a third step the recess is filled up with the plastic by means of casting, whereby the metal element is completely covered by the plastic; and subsequently the plastic is cured.

8. Method according to claim 7, wherein in the first step as glass vessel a crystal glass is selected,
wherein the punch is formed on a flat piston roof of a piston of a tool as a blunt cone with a base surface with a diameter, a top surface with a diameter, a height and a half aperture angle, wherein each of which approximately corresponding to the diameter of the base, the diameter of the top surface, the height and half the aperture angle of the recess, respectively.

9. Method according to claim 7, wherein in the second step the cylindrical metal element is bonded to the bottom of the recess by means of the adhesive,
wherein the axis of the metal element is arranged parallel and approximately congruent to the axis of the vessel, and wherein the surface of the metal element which faces the bottom of the recess is completely covered by a thin adhesive film and, when assembling vessel and metal element, the bottom of the recess which is in the vicinity of the metal element is completely covered by the adhesive film so that the bottom of the recess is completely sealed.

10. Method according to claim 7, wherein in the third step as the plastic a polyurethane, with a polyol and isocyanate component, is selected such that the plastic is in fluid/flow state at a working temperature of 60° C. to 80° C., and the plastic in the cured state adheres to the glass vessel and the metal element, the plastic can also be applied as a thin plastic film, and the cured plastic is transparent and has extensive self-healing properties, and moreover wherein a predetermined amount of the plastic is selected, such that, in the cured state, the recess with the metal element is largely filled whereby the metal element is embedded such that the metal element is covered by a plastic layer having a thickness of 0.5 mm to 2 mm.

11. Method according to claim 7, wherein in the second step as the adhesive a transparent solvent-free adhesive based on MS polymer is selected or as the adhesive a polyurethane, with a polyol and isocyanate component is selected such that the adhesive is identical with the plastic.

12. Use of the vessel with a metal element comprising a magnet according to claim 1 as a drinking vessel in interaction with a means of transport and/or in a vehicle of any kind and/or for the usage by persons with reduced motor skills and/or perception and/or attention and/or as a decorative element.

\* \* \* \* \*